Aug. 12, 1947.   G. HERZOG   2,425,533
DEVICE FOR MEASURING WALL THICKNESS
Filed Nov. 21, 1945
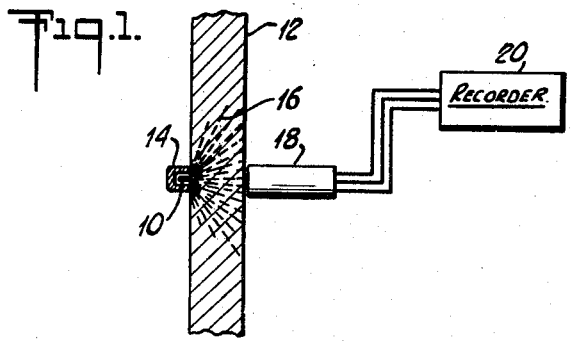
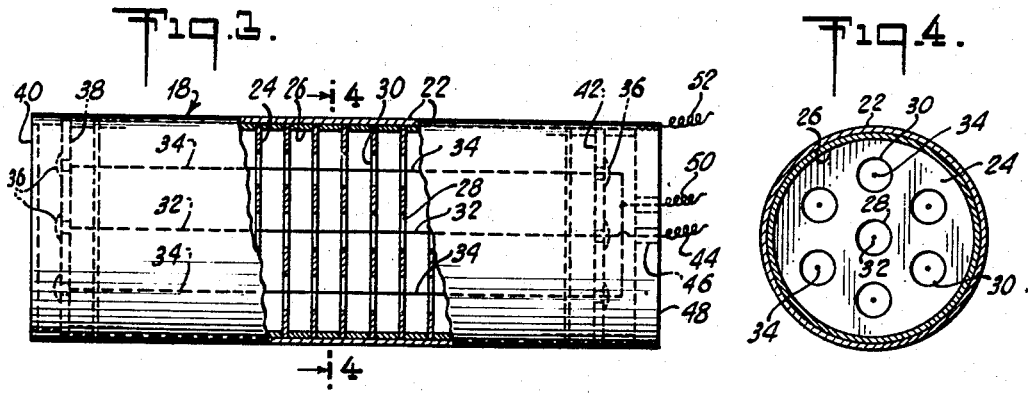
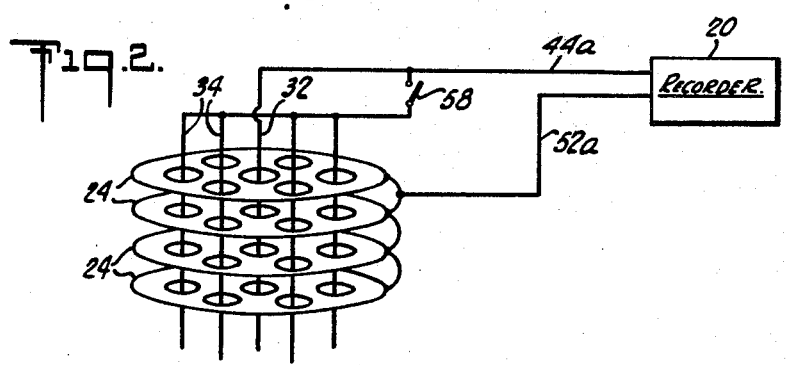
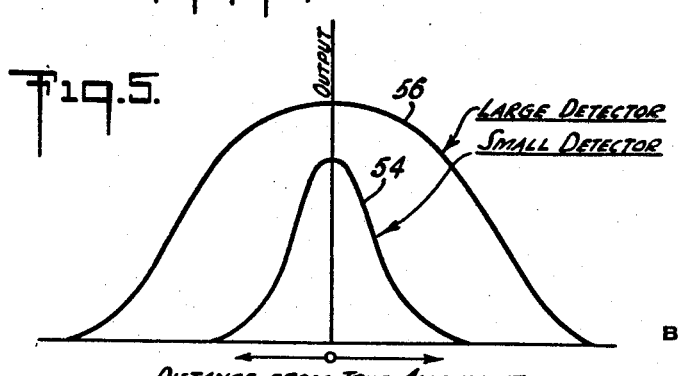
INVENTOR
GERHARD HERZOG.
BY
ATTORNEY Patented Aug. 12, 1947

2,425,533

UNITED STATES PATENT OFFICE 2,425,533

DEVICE FOR MEASURING WALL THICKNESS

Gerhard Herzog, Houston, Tex., assignor to The Texas Company, New York, N. Y., a corporation of Delaware Application November 21, 1945, Serial No. 630,018

5 Claims. (Cl. 250—83.6)

This invention relates to the measurement of wall thickness and more particularly to a device or rather an apparatus whereby the thickness of a wall or plate can be measured without the use of mechanical calipers or the like and without the necessity of drilling or otherwise disfiguring the wall.

In measuring the thickness of an object such, for instance, as a large plate or the wall of a tank or vessel by the so-called straight transmission method, a radioactive source is placed at one side of the wall and a radiation detector held at the other side of the wall opposite the source. The radiation intensity at the detector decreases with increasing wall thickness due to the absorption of the radiation in passing through the wall. In many instances it is difficult, if not impossible, with such an arrangement to determine the point on the surface of the wall which is exactly opposite the radiation source. Naturally, if the detector is not placed at such a point the radiation measured will have passed through a distance in the wall greater than the perpendicular distance from the source to the opposite side and an erroneous reading will result. This is particularly true in measuring the thickness of a wall of a large vessel where an operator outside the vessel, for instance, must locate the point on the vessel's outer surface directly opposite the source of radiation affixed to the inner surface.

In my application, Serial No. 630,017 filed concurrently herewith, a method and an apparatus are disclosed for overcoming this difficulty. In accordance with that method a radiation detector relatively small in size is moved about over the surface of the wall generally opposite the source in order to probe or explore the field of transmitted radiation and so to locate the point of approximate maximum intensity. That point will, of course, be closely opposite the radioactive source. When that point has been located, the small detector the output of which, due to the small size of the detector decreases rapidly when moved away from the point of alignment with the source, is replaced by a larger detector which is responsive to a much larger portion of the transmitted radiation and having an output which decreases very slowly when the detector is moved away from the point of alignment with the source. The output of the larger detector serves as a measure of the thickness of the wall between the detector and the source.

In accordance with the present invention, a single radiation detecting device is provided for exploring or probing the radiation field, i. e., measuring the intensity of the radiation over a plurality of small areas generally opposite the source, and for subsequently measuring a much larger portion of the transmitted radiation at and around the point of approximate maximum intensity. The detecting device comprises a plurality of small detector units which may be gamma ray counters in case gamma radiation is used as the medium to be measured. The detecting units are connected to an indicating means in such manner that the output of one only of the units is measured during the probing operation after which the response of the other detectors can be combined with that of the first mentioned detector so that, in case the detector is slightly off true alignment with the radiation source, an accurate measurement of the wall thickness can nevertheless be obtained.

Referring to the drawing:

Figure 1 is a vertical, sectional elevation through a portion of a wall showing the detector in place opposite the source, Figure 2 is a schematic diagram showing how the several units of the detecting device are electrically connected, Figure 3 is a side elevation partly in section of a detector, Figure 4 is a sectional view taken on the line 4—4 of Figure 3, while Figure 5 is a typical curve showing the output of one detector unit and also the combined output of all of the detector units.

Referring to Figure 1 of the drawing a source of penetrative radiation such as gamma rays 10 is shown as mounted on one side of a plate or wall 12, the thickness of which is to be measured. In case gamma radiation is used, the source 10 may comprise a small needle or capsule of radium or any other suitable substance either naturally or artificially radioactive and capable of emitting gamma rays. The source may be housed within a shield member 14 of lead or the like and may be attached temporarily or permanently to the wall surface by any suitable means such as, for instance, a permanent magnet not shown. The radiation from the source passes into the wall 12 in all directions as indicated by the dotted lines 16 and produces a radiation "field" at the surface of the wall, which field is, of course, at a maximum at the point exactly opposite the source. A radiation detector 18 such as a Geiger-Mueller or other counter or an ionization chamber is shown opposite the source 10 with electrical leads passing to a suitable amplifier and indicator or recorder 20. The detector 18 is adapted to be moved about over the right hand surface of the wall 12 in order to probe the transmitted radiation field. The detector 18 is preferably several inches in length and from one to two inches in diameter although detectors of other sizes may be used if desired.

With reference to Figures 3 and 4, the detector 18 comprises an elongated housing or shell 22 which may be of glass or a metal such as brass or aluminum and which is adapted to be sealed to contain a gas or gaseous mixture such as petroleum ether and argon or anhydrous ammonia and argon. Within the housing 22 are a plurality of thin disc-like cathode plates 24 of a suitable metal such, for instance, as lead, these plates being maintained in spaced parallel relation by means of spacer rings 26. In the detector shown in Figure 4, each of the cathode plates 24 is provided with a plurality of holes spaced substantially uniformly with one hole 28 at the center and a ring of holes 30 surrounding the center hole. The cathode plates are arranged in the housing 22 so that corresponding holes will be in alignment. Through the center of the series of holes 28 a fine anode wire 32 is stretched and through the centers of the surrounding series of holes similar anode wires 34 are disposed. One end of each anode wire is secured to a suitable insulating button or plug 36 disposed in an end plate 38, the buttons being arranged in alignment with the holes and the cathode plates. A cover plate 40 is adapted to be screwed or welded into the end of the housing 22. The other ends of the anode wires are secured by any suitable means to insulator buttons 36 in a plate or disc 42 near the right hand end of the detector, this plate corresponding to the plate 38 at the other end. As shown at the right hand end of Figure 3 an electrical connection or lead 44 passes through a suitable insulating bushing 46 in a cover plate 48 and is connected to the center anode wire 32. A similar electrical lead 50 passes through the end plate 48 and is connected to all of the anode wires 34 in the ring surrounding the center wire. Another electrical lead 52 is connected to the housing 22 and thus to the cathode plates 24. A detector of the general type of that shown in Figure 3 is more fully described in my copending application, Serial No. 562,870, filed November 10, 1944. If desired, the side walls of detector housing 22 may be surrounded by a layer of a radiation absorptive metal such as lead so as to shield the detector from radiation entering the detector from directions other than through the end 40.

From the foregoing, it will be seen that the detecting unit 18 is made up of a plurality, seven in this instance, of detecting units or counters. Obviously, when the anode 32 only, is connected to the indicating device 20 a small portion of the entire detecting device 18 is in use. However, when the anodes 34 are connected to the indicating device 20 together with the anode 32, the entire device 18 will be in use.

With reference to Figure 5, the curve 54 shows the output of a small detector or single counter such as that portion of the device 18 when the anode wire 32 alone is connected, as the device is moved in any direction away from the point of true alignment with the radiation source 10. It will be observed that the peak indicating maximum output when the detector is directly opposite the source 10, is quite sharp and it is therefore quite easy to locate a point almost exactly opposite the source by observing the response of the single detector or counter of which the wire 32 is the cathode. The curve 56 shows the output of a larger detector which in this case is made up of the entire device shown in Figure 3 when all of the anodes are connected to the amplifying and indicating device 20. It will be observed that the curve 56 has a much broader peak than the curve 54 and therefore it would be difficult when using the entire device 18 to align it exactly with the radiation source 10. However, since when all of the units in the device 18 are used together, the device is responsive to a considerably larger portion of the transmitted radiation 16 and any slight misplacement of the device, say by ¼ inch from the point of true alignment with the radiation source, will not cause an inaccurate reading of the thickness of the wall.

Figure 2 shows clearly how the anode wire 32 in the centrally disposed series of holes and the anode wires 34 in the surrounding holes can be connected to the device 20 so that either the single wire 32 is in the circuit or that wire and all of the wires 34 at the same time. In the diagrammatic representation a switch 58 is shown as adapted to connect the anode wires 34 to the lead 44a when desired. The lead 52a is shown as connecting the cathode plates to the device 20.

Although in the detector shown in Figures 2–4 seven anodes are used, it is to be understood that a greater or lesser number may be satisfactory. It may be desired to utilize a larger number of anodes and to connect a center group together electrically to be used during the exploring operation, instead of the single anode as illustrated in Figure 2.

It is believed that from the foregoing description the operation of the device will be readily understood. It is merely necessary to hold the detecting device 18 as shown in Figure 1 perpendicular to the surface of the wall 12 and to move the device about over that surface while the single anode 32 is connected in the circuit. By observing the device 20 the detector 18 can be moved so as to find the point of approximate maximum intensity at which point it is held while the remaining anodes 34 are connected in the circuit as by means of the switch 58. The output of the entire device 18 will then, when properly calibrated, serve as a measure of the thickness of the wall 12, since the amount of radiation from the source 10 transmitted to the detector will depend upon the thickness of the wall.

In the copending application of A. H. Lord, Jr., L. M. Evans, R. B. Heath and myself, Serial No. 574,870 filed January 26, 1945, electrical circuits are disclosed which can be used in connection with the amplification and the indication of the output of the radiation detector.

Although gamma rays have been mentioned as the medium to be measured it is to be understood that 10 may be a source of neutrons and each of the units in the device 18 can constitute an ionization chamber or a proportional counter.

Obviously many modifications and variations of the invention, as hereinbefore set forth, may be made without departing from the spirit and scope thereof and, therefore, only such limitations should be imposed as are indicated in the appended claims.

I claim:

1. An apparatus for measuring the thickness of a wall comprising a source of penetrative radiation adapted to be positioned at one side of said wall so that said radiation will pass into said wall, a detecting device having an elongated housing, a plurality of detector units disposed in parallel within and longitudinally of said housing, all but one of said units being connected together in a bank electrically in parallel, means connected to said one unit for indicating the output of that unit while the detecting device is moved about perpendicularly to said wall generally opposite said source in order to probe said field and locate the point of approximate maximum intensity, and means for connecting said bank of units to said indicating means so that the output of all the units, when the detecting device is placed at said point of approximate maximum intensity, will be indicated, said indication being a measure of the thickness of the wall at said point.

2. An apparatus for measuring the thickness of a wall comprising a source of gamma radiation adapted to be positioned at one side of said wall so that said radiation will pass into said wall, a detector having an elongated housing, a plurality of individual gamma ray counters disposed in parallel within and longitudinally of said housing, all but one of said counters being connected together in a bank electrically in parallel, means connected to said one counter for indicating the output of said counter while the detector is moved about perpendicularly to said wall generally opposite said source in order to probe said field and locate the point of approximate maximum intensity and thus the point approximately opposite said source, and means for connecting said bank of counters to said indicating means so that the output of all the counters, when the detector is placed at said point of approximate maximum intensity, will be indicated, said indication being a measure of the thickness of the wall at said point.

3. An apparatus for measuring the thickness of a wall comprising a source of gamma radiation adapted to be positioned at one side of said wall so that said radiation will pass into said wall, means for probing the field of transmitted radiation generally opposite said source in order to locate the point of approximate maximum intensity and thus the point approximately opposite said source and for measuring the amount of radiation transmitted through the wall at and around said point to determine the thickness of the wall at said point, comprising a detector having an elongated housing, a plurality of individual gamma ray counters disposed in parallel within and longitudinally of said housing, all but one of said counters being connected together in a bank electrically in parallel, means connected to said one counter for indicating the output of said counter during said probing operation and means for connecting said bank of counters to said indicating means so that the output of all the counters when the detector is placed at said point of approximate maximum intensity, will be indicated, said indication being a measure of the thickness of the wall at said point.

4. An apparatus for measuring the thickness of a wall comprising a source of penetrative radiation adapted to be positioned at one side of said wall so that said radiation will pass into said wall, means for probing the field of transmitted radiation generally opposite said source to locate the point of approximate maximum intensity and for measuring the amount of radiation transmitted through the wall to determine the thickness thereof comprising a detector having a housing, a plurality of cathode plates in said housing arranged in separated parallel relation, said plates being provided with several series of parallel aligned holes, an anode wire disposed axially through each series of holes, the anode wires in all but one of said holes being connected together electrically in a bank, means connected to said cathode bank and to said one anode wire for indicating the output of a portion of the detector while the detector is moved about with said wires perpendicular to said wall to probe said field and means for subsequently connecting the anode wires in said bank to said one anode wire so that the output of the entire detector when placed at said point of approximate maximum intensity will be indicated, said indication being a measure of the thickness of the wall at said point.

5. An apparatus for measuring the thickness of a wall comprising a source of penetrative radiation adapted to be positioned at one side of said wall so that said radiation will pass into said wall, means for probing the field of transmitted radiation generally opposite said source to locate the point of approximate maximum intensity and for measuring the amount of radiation transmitted through the wall comprising a detector having a housing, a plurality of cathode plates in said housing arranged in a bank in separated parallel relation, said plates being provided with a centrally disposed series of aligned holes and with a plurality of series of aligned holes parallel to and surrounding said first series, an anode wire disposed axially through each series of holes, the anode wires in said surrounding holes being connected together electrically, means connected to said cathode bank and to the centrally disposed anode wire for indicating the output of a portion of the detector while the detector is moved about with the aligned holes perpendicular to said wall to probe said field and means for subsequently connecting the anode wires in said surrounding holes to said first anode wire so that the output of the entire detector when placed at said point of approximate maximum intensity will be indicated, said indication being a measure of the thickness of the wall at said point.

GERHARD HERZOG.

REFERENCES CITED

The following references are of record in the file of this patent:

UNITED STATES PATENTS

| Number | Name | Date |
|---|---|---|
| 2,383,477 | Friedman | Aug. 28, 1945 |
| 2,397,071 | Hare | Mar. 19, 1946 |